Dec. 25, 1956 W. F. SCHEEL 2,775,316
BRAKE SHOE ADJUSTER AND GUIDE
Filed May 26, 1952 2 Sheets-Sheet 1

INVENTOR
WALTHER F. SCHEEL

BY *Strauch, Nolan & Diggins*
ATTORNEYS

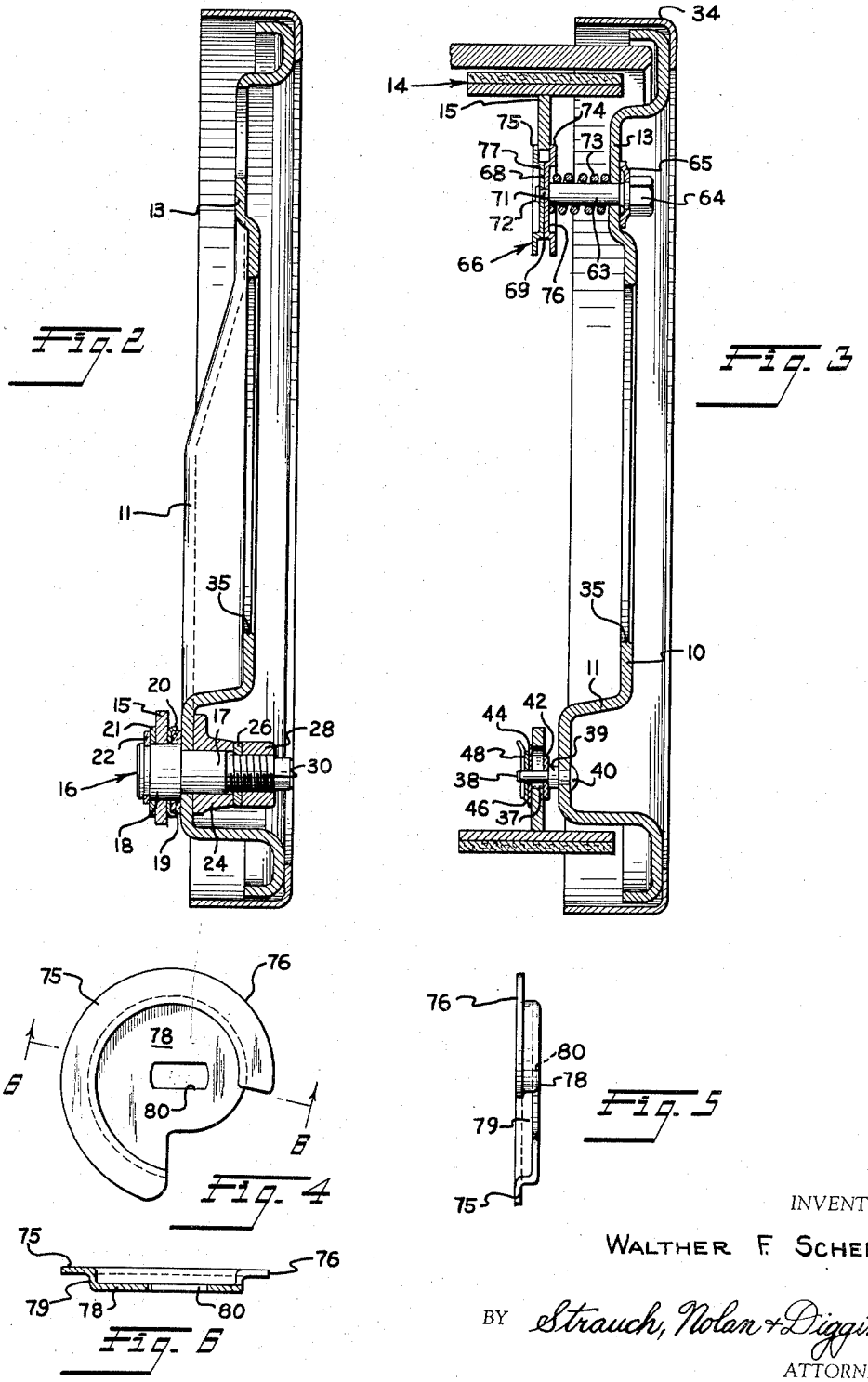

2,775,316

BRAKE SHOE ADJUSTER AND GUIDE

Walther F. Scheel, Detroit, Mich., assignor, by mesne assignments, to Rockwell Spring and Axle Company, Coraopolis, Pa., a corporation of Pennsylvania Application May 26, 1952, Serial No. 289,955

3 Claims. (Cl. 188—79.5)

This invention relates to an improved vehicle assembly and certain elements thereof and is particularly directed to a novel brake adjustment mechanism wherein a special flanged adjustment cam also functions as a guide for the brake shoe web.

The invention will be described in its preferred embodiment for improvement of an existing brake assembly wherein the prior structure permitted such side motion of the brake shoes as might cause the pins and springs guiding and biasing the brake shoes to be sheared or loosened by vibration thus allowing the brake shoes to move sideways out of contact with the adjusting cam and thereby fouling the assembly.

In adapting the invention to improve this prior construction I have provided a flanged adjustment cam that functions as a guide for the associated brake shoe web and which eliminates guide means hitherto considered necessary, and thereby creates a new assembly of reliable and improved construction and operation.

It is therefore the major object of my invention to provide a brake assembly embodying a novel combined adjustment and guide for each brake shoe.

Another object of the invention is to provide a novel brake guide and adjustment mechanism which effectively eliminates side motion and minimizes rattle and vibration.

Further objects of this invention are to provide a novel flanged brake shoe adjusting cam and a novel brake assembly incorporating such cams.

Another object of this invention is to provide a novel brake assembly wherein it is easy to install, service and dismount the brake shoes and associated adjustment.

Further objects of the invention will appear as the description proceeds in connection with the appended claims and the annexed drawings wherein:

Figure 2 is a transverse section substantially on line 2—2 of Figure 1, illustrating the backing plate and anchor pin structure.

Figure 3 is a transverse section substantially on line 3—3 of Figure 1, illustrating the backing plate, guide pin and flanged adjustment cam structure.

Figure 4 is a side elevation of one of the flanged adjustment cam elements.

Figure 5 is an end elevation of the element of Figure 4.

Figure 6 is a section on line 6—6 of Figure 4.

Figure 1:
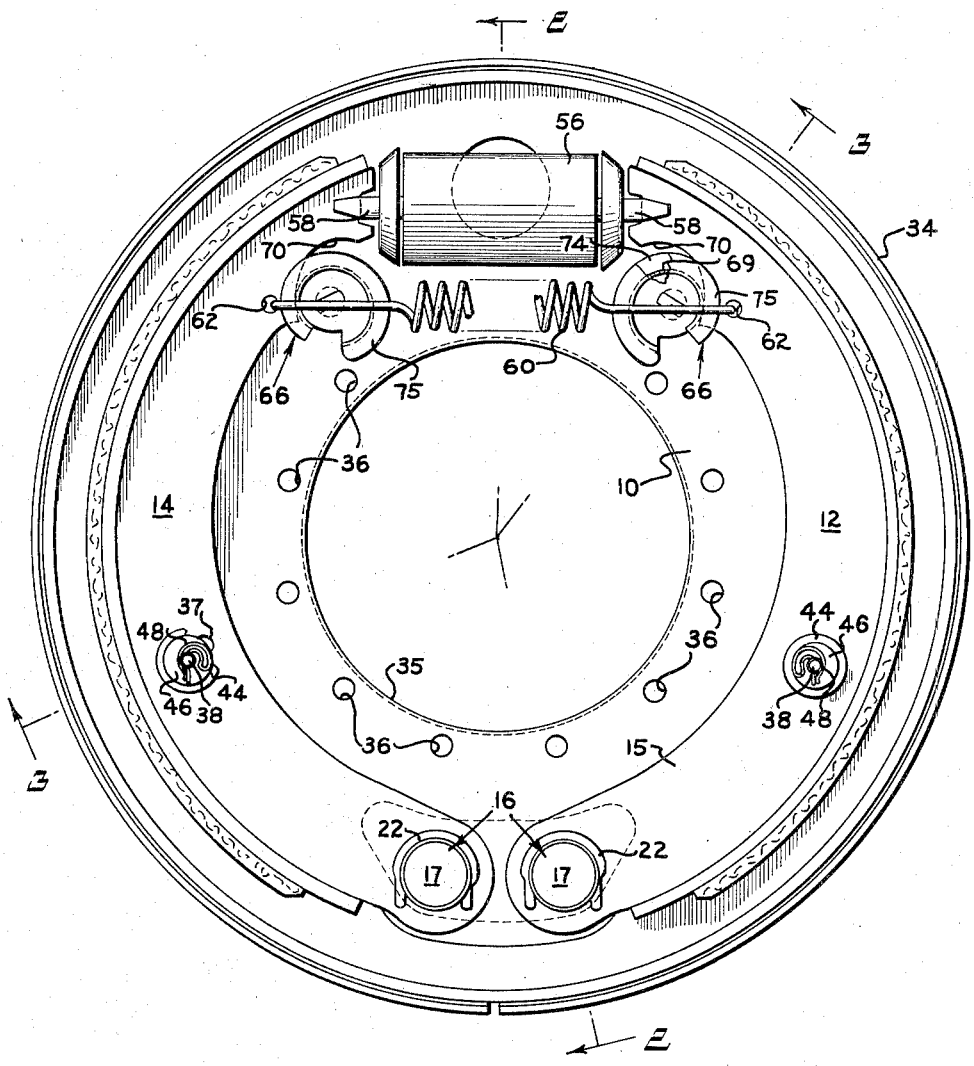
Figure 1 is a plan view of a brake assembly according to a preferred embodiment of the invention illustrating the brake shoes, adjustment cams, springs and hydraulic wheel cylinder in operative association.

Referring now to the drawings and more particularly to Figures 1 and 3, a brake backing plate 10 has an arcuate boss 11 formed around the lower end thereof, dropping to a more shallow boss 13 at the upper end. Plate 10 supports brake shoe units 12 and 14 which are anchored by and pivotally mounted upon anchor pin assemblies 16. Referring to Figure 2, each anchor pin assembly 16 comprises a stud 17 projecting through an aperture in the boss 11 and having an enlarged head 18 on one side of the plate. Head 18 is surrounded by a felt washer 19 crimped in a sheet metal cap 20, and the lower end of the flat brake shoe web 15 is apertured to be journaled on cylindrical head 18. A washer 21 and a snap ring 22 are mounted on head 18 on the other side of web 15.

On the other side of boss 11, the studs 17 are mounted in spaced apertures of a rigid bracket 24 which may be welded to the backing plate. A resilient washer 26 and a nut 28 are mounted on the threaded end 30 of each stud 17, so when nuts 28 are drawn tight the studs 17 are rigidly and non-rotatably secured to plate 10 without binding the pivot of the brake shoe.

A dust shield 34 surrounds plate 10 and is secured to it as by welding. Plate 10 is centrally apertured at 35 and provided with a series of rivet holes 36 for attachment to an axle housing.

Intermediate its ends each brake shoe web 15 is formed with an aperture 37 through which extends a guide pin 38 (Figure 3), apertures 37 being shaped and of such size as to permit free pivotal movement of the brake shoes.

Each guide pin 38 has an enlarged shoulder 39 seated against boss 11 and passes through an aperture in boss 11 where it is riveted over at 40 to secure the pin non-rotatably to plate 10. A washer 42 is mounted between shoe web 15 and shoulder 39 and on the other side of the shoe web are washers 44 and 46 held on the pin by a hair pin cotter key 48. Thus each web 15 is slidably supported by its associated guide pin and washer assemblies.

Hydraulic actuator cylinder 56 is supported on boss 13 and includes opposed thrust arms 58 interfitting with the adjacent ends of the brake shoes. Brake shoe return spring 60 is supported by brake shoe units 12 and 14, being hooked at each end through holes 62 and normally under tension.

Adjacent the actuator two brake cam support pins 63 rotatably extend through apertures in the boss 13. Pins 63 are preferably formed with haxagonal bolt heads 64 that compress resilient friction retainer disks 65 against the rear of the backing plate. Pins 63 are equidistant from a vertical diameter of plate 10.

Fixed upon pins 63 are adjustment cams 66 each comprising a body 68 having on its periphery a continuously curved uniformly changing lift cam face 69 adapted to engage an arcuate face 70 on the ends of the asociated brake shoe web. Preferably the reduced end 71 of pin 63 is non-circular and projects through a similarly shaped hole in cam body 68 and is peened over as at 72 to permanently secure the cam upon the shoulder provided on the pin. A coiled compression spring 73 surrounds pin 63 between cam 66 and boss 13.

Extending about each cam 66 are parallel side flanges 74 and 75 defining a guide track and adapted to slidably embrace the adjacent flat sides of shoe webs 15 as illustrated in Figure 3. As illustrated in Figure 1, cam face 69 is in contact with shoe face 70 at one point only, and rotation of pin 63 at the right hand side of Figure 1 for example will rotate cam 66 to rock shoe 12 outwardly toward the brake drum (not shown) contact with face 70 being maintained by spring 60.

Springs 73 insure that cams 66 remain in the plane of the brake shoe webs, and also coact with spring retainers 65 to maintain the cams in adjusted position.

Referring to Figure 1 it will be observed that cams 66 serve as stops determining the relaxed position of the brake shoes, so that rotation of cams 66 adjusts this position and therefore the spacing between the shoes and the brake drum. When actuator 56 is energized, opposite displacement of arms 58 rocks the shoes 12 and 14 outwardly and into eventual contact with the brake drum. The depth of the track defined by flanges 74 and 75 is such that web 15 is always embraced by the flanges during the entire range of operative movement of the shoe regardless of the adjusted position of cam 66 that may be made to compensate for wear of the linings, slack in the system and excessive lining to drum clearances.

In the above-described construction each brake web rocks back and forth during operation in the same path without tilting, wobbling or shifting sidewise due to the guide action of the flange track on the associated cam 66 and the washers on guide pins 38. No further guide means is needed.

During assembly added washers can be installed on pins 38 to insure that the path of rocking movement of each web 15 is at the same level as the cam track and in the plane of the web perpendicular to the axis of the pivots at 16.

Preferably, see Figure 3, each cam 66 comprises two welded together stamped sheet metal elements 76 and 77 of similar but of reversed shape. Each element, see Figures 4–6, is essentially cup-shaped with a body web 78 having an aperture 80 side wall 79 and a peripheral flange 74 or 75. The side walls are so shaped that when assembled with the body webs back to back as in Figure 3 they form the cam face 69 and associated brake shoe web guide track.

It will be appreciated that any other manner of constructing the cam 63 wherein the cam face 69 is flanked by track defining elements such as flanges 74 and 75 is within the scope of the invention.

I have therefore provided an improved brake assembly which is easy to install or dismantle since only one guide pin unit is needed intermediate the ends of the brake shoe. The mechanism is free of sidewise displacement and rattling of the shoes during operation, and vibration and separation of the cams and brake shoes during assembly is eliminated.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle brake assembly, a support, an anchor member on said support, a brake shoe having a web pivoted near one end on said anchor member, a pin rotatably adjustably mounted on said support near the other end of said shoe and projecting through said support, an enlarged operating head on said pin on the side of the support opposite said brake shoe, a spring adjustment retainer compressed between said pin head and the support, a cam fixed on said pin having two substantially cup-shaped members integrally fixed to each other and together providing a peripheral camming surface portion of changing curvature adapted to engage an edge of said shoe and spaced flanged peripheral portions formed integral with said camming surface portion for slidably embracing and positively guiding said shoe web during its entire operative range of pivotal movement on said anchor member, and a compression spring interposed between said cam and said support.

2. In a vehicle brake assembly, a support, an anchor member on said support, a brake shoe having a web pivoted near one end of said anchor member, a pin rotatably adjustably mounted on said support near the other end of said shoe and projecting through said support, an enlarged operating head on said pin on the side of the support opposite said brake shoe, a cam fixed on said pin having two substantially cup-shaped members integrally fixed to each other and together providing a peripheral camming surface portion of changing curvature adapted to engage an edge of said shoe web and spaced flanged peripheral portions formed integral with said camming surface portion for slidably embracing said web and positively guiding said shoe during its entire operative range of pivotal movement on said anchor member, and a compression spring interposed between said cam and said support.

3. A combination brake shoe adjustment cam and shoe web guide comprising: an integrally joined body assembly made of two complementary, substantially cup-shaped sheet metal elements of the same size with means permanently securing the cup bottoms of the two elements together so the side walls extend away from each other and coextensively define a peripheral camming surface portion; and flanges integrally formed with the side wall of each element, spaced from the bottom of each element, and extending radially outwardly and parallel to each other in the body assembly to define a guide track, rigidly fixed relative to said camming surface, for a brake shoe web.

References Cited in the file of this patent

UNITED STATES PATENTS

| | | |
|---|---|---|
| 1,860,959 | Schnell | May 31, 1932 |
| 1,912,217 | Pentz | May 30, 1933 |
| 1,943,830 | La Brie | Jan. 16, 1934 |
| 1,984,883 | La Brie | Dec. 18, 1934 |
| 2,041,462 | Frank | May 19, 1936 |
| 2,188,452 | Berglund | Jan. 30, 1940 |
| 2,206,657 | Boldt | July 2, 1940 |
| 2,266,728 | Ambrose | Dec. 23, 1941 |
| 2,330,004 | Neville | Sept. 21, 1943 |
| 2,533,927 | Geyer | Dec. 12, 1950 |

FOREIGN PATENTS

| | | |
|---|---|---|
| 647,901 | Germany | July 16, 1937 |